United States Patent
Kim et al.

(10) Patent No.: US 11,458,689 B2
(45) Date of Patent: *Oct. 4, 2022

(54) METHOD OF GOLF BALL MANUFACTURE EMPLOYING ULTRASONIC WELDING, AND RESULTING GOLF BALL AND GOLF BALL COMPONENTS AND/OR LAYERS

(71) Applicants: Masion de Golf, Carlsbad, CA (US); Qingdao SM Parker Golf Ltd., Qingdao (CN)

(72) Inventors: Hyun Jin Kim, Carlsbad, CA (US); Ki Jung Kim, Busan (KR); Deuk Ho Song, Geoje-si (KR)

(73) Assignees: MASION DE GOLF, Carlsbad, CA (US); QINGDAO SM PARKER GOLF LTD., Qingdao (CN)

(*) Notice: Subject to any disclaimer, the term of this patent is extended or adjusted under 35 U.S.C. 154(b) by 0 days.

This patent is subject to a terminal disclaimer.

(21) Appl. No.: 17/385,616

(22) Filed: Jul. 26, 2021

(65) Prior Publication Data

US 2021/0354399 A1    Nov. 18, 2021

Related U.S. Application Data

(63) Continuation of application No. 16/201,967, filed on Nov. 27, 2018, now Pat. No. 11,072,126.

(51) Int. Cl.
*B29C 65/08* (2006.01)
*A63B 37/00* (2006.01)
(Continued)

(52) U.S. Cl.
CPC .......... *B29C 65/08* (2013.01); *A63B 37/0033* (2013.01); *A63B 37/0045* (2013.01);
(Continued)

(58) Field of Classification Search
CPC ..... B29C 65/08; B29C 66/81; A63B 2102/32; A63B 37/0033; A63B 37/0045; A63B 37/0075; A63B 37/0076
(Continued)

(56) References Cited

U.S. PATENT DOCUMENTS 3,284,257 A    11/1966   Soloff et al.
5,150,906 A    9/1992    Molitor et al.
(Continued)

*Primary Examiner* — James D Sells
(74) *Attorney, Agent, or Firm* — Squire Patton Boggs (US) LLP

(57) ABSTRACT

A method of producing a golf ball applies ultrasonic welding on two half shells to form at least one intermediate layer, at least one cover layer, or at least one intermediate layer and at least one cover layer. The ultrasonic welding may include pressing the two half shells together, delivering a high power electrical signal to a welding stack, and converting the high power electrical signal at the welding stack to ultrasonic energy. The converting may include converting the high power electrical signal into a mechanical vibration, modifying an amplitude of the mechanical vibration to generate a modified mechanical vibration, and applying the modified mechanical vibration to an interface of the two half shells to weld them together ultrasonically. Aspects also relate to golf balls, or one or more layers thereof, made using ultrasonic welding.

20 Claims, 4 Drawing Sheets

(51) Int. Cl.
    *B29C 65/00*     (2006.01)
    *B29L 31/54*     (2006.01)
    *A63B 102/32*     (2015.01)
    *B29K 101/12*     (2006.01)

(52) U.S. Cl.
    CPC .......... *B29C 66/81* (2013.01); *A63B 37/0075* (2013.01); *A63B 37/0076* (2013.01); *A63B 2102/32* (2015.10); *B29K 2101/12* (2013.01); *B29L 2031/546* (2013.01)

(58) Field of Classification Search
    USPC ........................................................ 156/73.1
    See application file for complete search history.

(56) References Cited

U.S. PATENT DOCUMENTS

| | | |
|---|---|---|
| 5,306,760 A | 4/1994 | Sullivan |
| 5,855,706 A | 1/1999 | Grewell |
| 6,056,842 A | 5/2000 | Dalton et al. |
| 6,213,894 B1 | 4/2001 | Sullivan et al. |
| 6,299,550 B1 | 10/2001 | Molitor et al. |
| 6,562,906 B2 | 5/2003 | Chen |
| 7,878,926 B2 | 2/2011 | Kim et al. |
| 7,901,299 B2 | 3/2011 | Kim et al. |
| 8,177,665 B2 | 5/2012 | Loper et al. |
| 8,785,561 B2 | 7/2014 | Kim et al. |
| 9,108,082 B2 | 8/2015 | Kim et al. |
| 9,220,949 B2 | 12/2015 | Kim et al. |
| 9,421,425 B2 | 8/2016 | Loper et al. |
| 11,072,126 B2 * | 7/2021 | Kim ...................... B29C 66/543 |
| 11,077,622 B2 * | 8/2021 | Kim ...................... B29C 66/342 |
| 2003/0232666 A1 | 12/2003 | Sullivan et al. |
| 2006/0172823 A1 | 8/2006 | Loper et al. |
| 2008/0096692 A1 | 4/2008 | Kennedy et al. |
| 2010/0125002 A1 | 5/2010 | Kim et al. |
| 2014/0274466 A1 | 9/2014 | Mochizuki et al. |
| 2021/0362436 A1 * | 11/2021 | Kim ...................... B29C 66/342 |

* cited by examiner

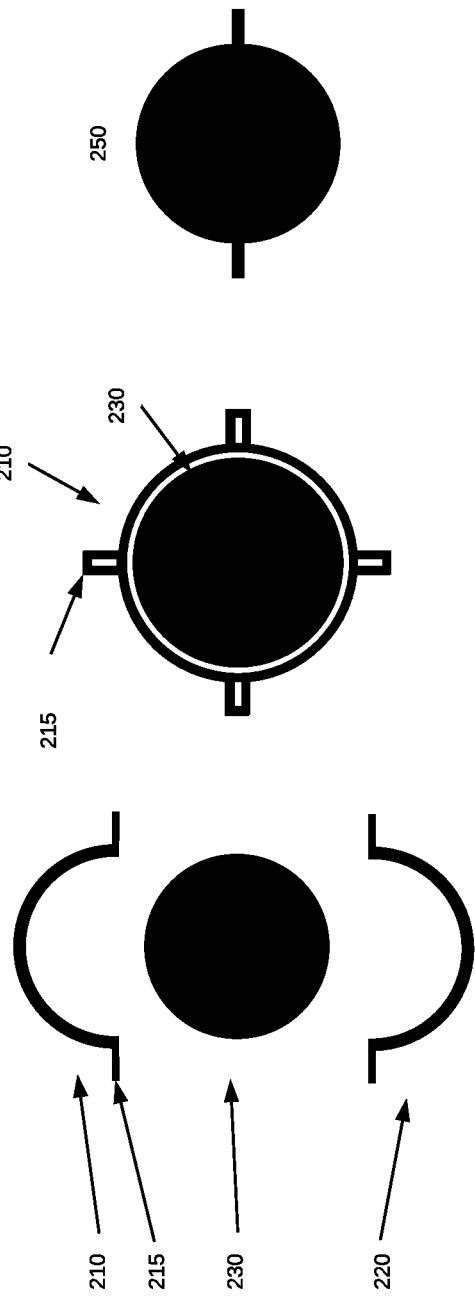
FIG. 2A
FIG. 2B
FIG. 2C
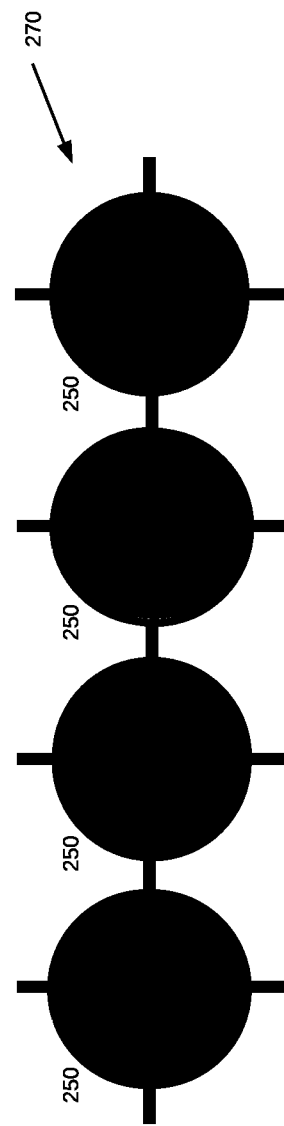
FIG. 2D

METHOD OF GOLF BALL MANUFACTURE EMPLOYING ULTRASONIC WELDING, AND RESULTING GOLF BALL AND GOLF BALL COMPONENTS AND/OR LAYERS

CROSS-REFERENCE TO RELATED APPLICATION

This application is a continuation of pending U.S. application Ser. No. 16/201,967, filed Nov. 27, 2018, entitled "METHOD OF GOLF BALL MANUFACTURE EMPLOYING ULTRASONIC WELDING, AND RESULTING GOLF BALL AND GOLF BALL COMPONENTS AND/OR LAYERS", and incorporates the entire contents of that pending application by reference.

BACKGROUND OF THE INVENTION

Field of the Invention

The present invention relates to golf ball manufacture. More particularly, the invention relates to golf ball manufacture employing flexible design while achieving consistency in manufacture to produce a high performance golf ball with a cover having uniform thickness and/or one or more intermediate layers of varying thickness. Still more particularly, the invention relates to golf ball manufacture employing ultrasonic welding to achieve the above-mentioned goals, and to golf balls and components thereof made by a method employing ultrasonic welding.

Description of the Conventional Art

Conventionally, golf ball manufacturers have employed at least three different processes to form either the cover or one or more of the intermediate layers of a golf ball. Such processes include injection molding, compression molding, and casting. In injection molding, a golf ball core or a mantled core is located in a cavity, with the core held by pins at the center of the cavity. Molten resin is injected into the cavity, and when the resin has hardened sufficiently, the pins retract to complete the process. Injection molding is simple and convenient. However, one problem is that if, for example, the pins are retracted before the resin has hardened sufficiently, the core or mantle core can shift, resulting in an off center core and uneven layer thickness. Another problem is the limitation on layer thickness that can be achieved through injection molding process. It is difficult to injection mold a thin layer. This limitation constrains golf ball design and construction, and diminishes performance of the resulting golf ball with respect to spin characteristic, flight dispersion, shot accuracy, and impact endurance.

In compression molding, two half shells are compressed together to form an intermediate layer or a cover layer. However, one problem with this type of construction method is that the material forming an inner layer can flow out during the process, and even can flow through an outer layer along the parting line or mating area, usually near the ball's equator, resulting in uneven inner-layer and/or outer layer thickness. The uneven layer thickness likewise negatively affects performance of the resulting golf ball in areas such as shot accuracy, flight performance, and impact endurance.

In casting, a mixture of a reactive chemical and a liquid type resin is poured or injected into each half-shell of a book-mold, the core or mantled core is located within the mold, and book-mold is closed to complete the molding process with a chemical reaction of a mixture. Since this process uses a liquid type resin, it is possible to mold a thin layer. However, one problem is that it can be challenging to control the centering of a core or mantle, and to control the layer thickness, again adversely affecting performance of the resulting golf ball in areas such as shot accuracy, flight performance, and impact endurance. Another problem is the limitation on material selection, because only a liquid type resin can be used in casting process.

SUMMARY OF THE INVENTION

The present invention has been developed to overcome the above described disadvantages, producing a golf ball with uniform layer thickness, consistent golf ball manufacture and corresponding performance, and excellent durability. To accomplish these and other goals, in accordance with aspects of the invention, a golf ball manufacturing method employs ultrasonic welding to fuse two half shells together. Welding the half shells can form the golf ball's outer layer, or one of the intermediate layers.

Aspects of the invention also relate to a golf ball, and components thereof, manufactured according to the techniques disclosed herein.

BRIEF DESCRIPTION OF DRAWINGS

The foregoing and other aspects and features according to embodiments of the present invention now will be described in detail with reference to the accompanying drawings, in which:

FIGS. 2A-2D show the use of shells for succeeding layers of a golf ball, assembled using ultrasonic welding according to an embodiment;

DETAILED DESCRIPTION

Figure 1:
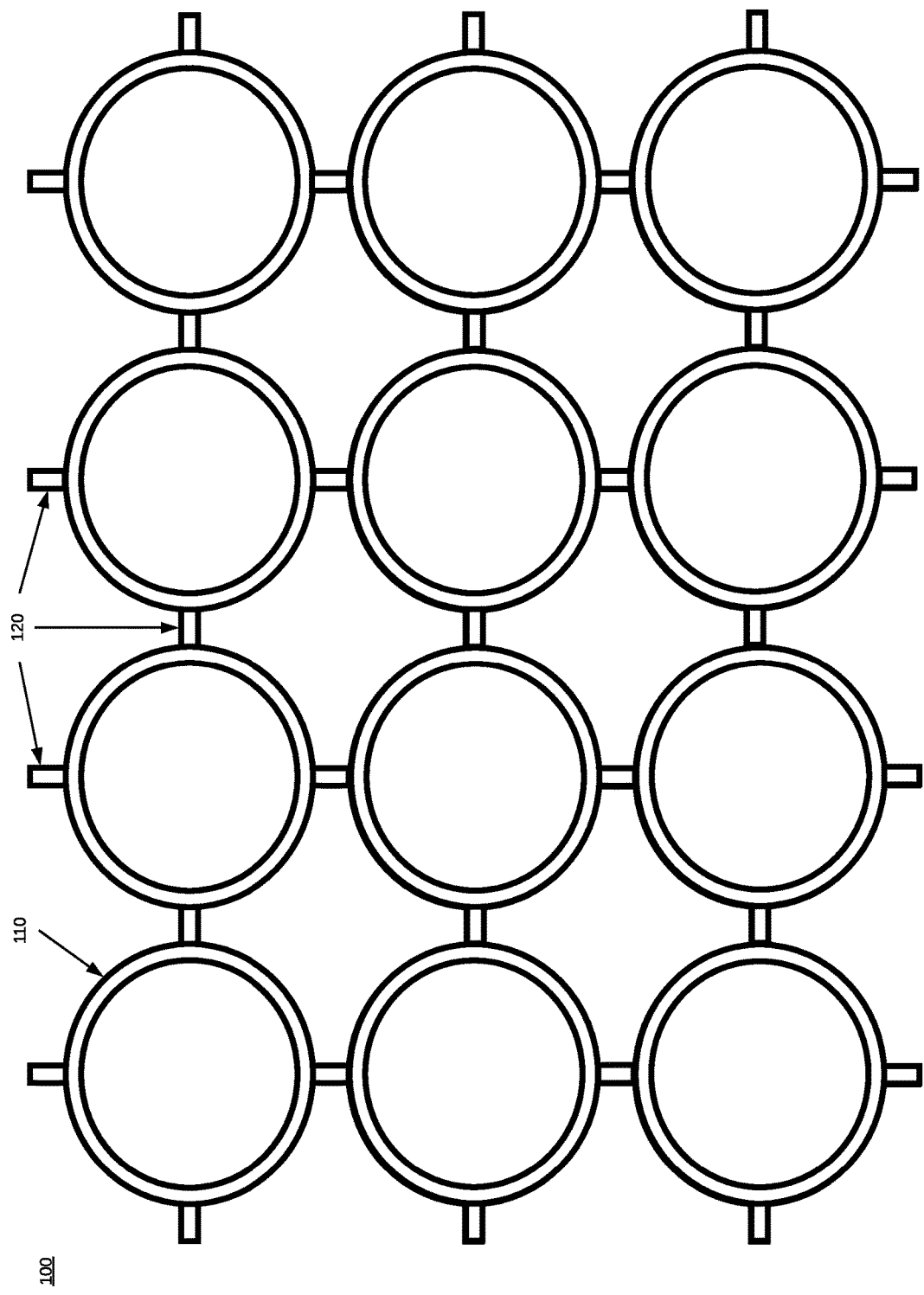
FIG. 1 shows a form of shells used for layers of a golf ball according to an embodiment.

The following description provides examples of application of ultrasonic welding to golf ball manufacture, as well as numerous examples of materials for the cover layer as well as for one or more intermediate layers. These layers are basically one form of plastic or another. In addition, for the joining of half shells in the course of manufacture, no intermediate material, such as epoxy or other adhesive is provided. Effectively, the vibrations that ultrasonic welding creates in the pieces being joined result in substantial heat, so that parts are effectively fused together. Consequently, in the following description, one or more forms of the term "welding" may appear, or one or more forms of the term "fusion" may appear. For purposes of the following description, the terms are intended to be interchangeable.

In many applications of ultrasonic welding, parts to be bonded will be held together under pressure, and ultrasonic energy applied to effect the welding. Normally, the parts are held under pressure between a fixed shaped base, often referred to as an anvil, and a source of the high frequency vibrations, often referred to as a horn or a sonotrode connected to a transducer. The transducer causes acoustic vibration to be emitted. In one aspect, when welding plastics of the type used for golf ball covers and intermediate layers as described herein, the interface of the pieces being welded will be configured to concentrate and thereby facilitate the fusion process. Ultrasonic welding of thermoplastics causes local melting of the plastic as a result of heat caused by vibrational energy along the joint to be welded.

Looking more closely at ultrasonic welding systems of the type used in embodiments of the present invention, the basic elements are:
1. Structure that holds, under pressure, the parts to be welded.
2. A base, often called an anvil as noted above, on which parts to be welded are placed.
As discussed herein, the base or anvil for the ultrasonic welding process according to embodiments will hold one of the half-shells to be welded by allowing the high frequency vibrations to be directed to the interface to be welded. Such a structure for holding a half shell as discussed herein may be referred to as a nest or a fixture.
3. A power supply delivers a high power electrical signal. In some embodiments, the frequency of the electrical signal matches a resonance frequency of a welding stack, mentioned below.
4. A welding stack whose elements are tuned to resonate at the same ultrasonic frequency. In some embodiments, the stack includes:
    a. A converter that converts energy from the power supply to acoustic vibrations, using a piezoelectric effect. In one aspect, a piezoelectric transducer effects the conversion.
    b. In some embodiments, a booster modifies the amplitude of the vibrations, usually mechanically. In some ultrasonic welding systems, the booster also is used to clamp the stack together.
    c. A horn, or sonotrode, that may follow the shape of the parts being welded, provide further amplification of the vibrations, and apply the vibrations to the parts to be welded.
5. A controller controls movement of the structure holding together the pieces to be welded, and also controls delivery of ultrasonic energy to effect welding or fusion.

In accordance with embodiments of the invention, a method of producing a golf ball comprises performing ultrasonic welding on two half shells to form a layer selected from the group consisting of at least one intermediate layer, at least one cover layer, or at least one intermediate layer and at least one cover layer, wherein the intermediate layer and/or cover layer comprises at least one material selected from the group consisting of thermoplastic resin, resin mixture, reactive resin, resin blended with reactive chemicals to bring a cure, or resin having diene group in a structure mixed with free-radical initiators and/or crosslinking chemicals.

According to some aspects, the composition of at least one intermediate layer and/or cover layer may comprise polymer selected from the group consisting of thermoplastic polyurethane, thermoset polyurethane, polyurethane urea, polyurea, polyamide elastomer, thermoplastic copolyetherester block copolymer, thermoplastic copolyesterester block copolymer, polyethylene-octene, polybutylene-octene, polyoctenamer, polyisoprene, polybutadiene, 1,2-syndiotactic polybutadiene, thermoplastic vulcanizate, ionomer, copolymeric ionomer, terpolymeric ionomer, bi-modal ionomer, modified ionomer, polyamide ionomer, polycarbonate, polyolefin, polyamide, copolymeric polyamide, polyester, polyvinyl alcohol, acrylonitrile-butadiene-styrene copolymer, polyarylate, polyacrylate, polyphenylene ether, impact-modified polyphenylene ether, high impact polystyrene, diallyl phthalate polymer, metallocene catalyzed polymer, styrene-acrylonitrile (SAN) (including olefin-modified SAN and acrylonitrile-styrene-acrylonitrile), styrene-maleic anhydride (S/MA) polymer, styrenic copolymer, functionalized styrenic copolymer, functionalized styrenic terpolymer, styrenic terpolymer, cellulose polymer, liquid crystal polymer (LCP), ethylene-propylene copolymer, ethylene-propylene-diene terpolymer (EPDM), ethylene vinyl acetate, ethylene-vinyl acetate copolymers (EVA), polysiloxane, and combinations thereof.

In accordance with embodiments of the invention, the method may further comprise:
1. pressing the two half shells together;
2. delivering a high power electrical signal to a welding stack; and
3. converting the high power electrical signal at the welding stack to ultrasonic energy.

In accordance with embodiments of the invention, the method may further comprise:
a. converting the high power electrical signal into a mechanical vibration;
b. modifying an amplitude of the mechanical vibration to generate a modified mechanical vibration; and
c. applying the modified mechanical vibration to an interface of the two half shells to weld them together ultrasonically.

Ultrasonic welding is carried out at a range of frequencies, selected to provide the necessary ultrasonic energy to fuse them together appropriately. In embodiments, the range of frequencies is greater than 5 kHz and less than 100 MHz, preferably greater than 10 kHz and less than 95 MHz, more preferably greater than 15 kHz and less than 90 MHz, and still more preferably greater than 20 kHz and less than 80 MHz.

Duration of application of the ultrasonic frequency also is in a range, selected to provide enough ultrasonic energy to ensure that there is enough heat, for a long enough time, for the pieces to fuse together appropriately. The range may be from 0.1 sec. to 60 sec., preferably from 0.3 sec. to 40 sec., more preferably from 0.5 sec. to 30 sec., and still more preferably from 1 sec. to 20 sec.

In one aspect, at least one pair of half shells at a time are fused together per molding cycle. Preferably, at least four pairs of half shells at a time are fused together per molding cycle. More preferably, more than 10 pairs of half shells at a time are fused together per molding cycle. Still more preferably, more than 20 pairs of half shells at a time are fused together per molding cycle.

Following are examples of application of ultrasonic welding to golf ball manufacture according to embodiments:
1. A core is inserted between two half-shells, which are fused together by ultrasonic welding to form a cover layer. Dimples then are formed in the cover layer by compression molding, applying heat and pressure.
2. A core is inserted between two half-shells, which are fused together by ultrasonic welding to form at least one intermediate layer. A cover layer, with dimples, then is formed by injection molding, compression molding, or casting.
3. A mantled core is inserted between two half-shells, which are fused together by ultrasonic welding to form at least one inner cover layer. At least one outer cover layer, with dimples, then is formed by injection molding, compression molding, or casting.
4. A core with at least one intermediate layer is inserted between two half-shells, which are fused together by ultrasonic welding process to form a cover layer. Dimples then are formed in the cover layer by compression molding, applying heat and pressure.

5. A core with at least one intermediate layer and at least one inner cover layer is inserted between two half-shells, which are fused together by ultrasonic welding to form a cover layer. Dimples then are formed in the cover layer by compression molding, applying heat and pressure.

6. A core is inserted between two half-shells of each inner cover layer and outer cover layer, which are fused together by ultrasonic welding to form an inner cover layer and an outer cover layer. Dimples then are formed in the outer cover layer by compression molding, applying heat and pressure.

7. A core is inserted between two half-shells of each inner-intermediate layer and outer-intermediate layer, which are fused together by ultrasonic welding to form an inner-intermediate layer and an outer-intermediate layer. At least one outer cover layer, with dimples, is formed by injection molding, compression molding, or casting.

8. A core with at least one intermediate layer is inserted between two half-shells of each inner cover layer and outer cover layer, which are fused together by ultrasonic welding to form an inner cover layer and an outer cover layer. Dimples then are formed in the outer cover layer by compression molding, applying heat and pressure.

Particular dimple sizes, shapes, patterns, and arrangements are not critical to the present disclosure. A golf ball made according to some embodiments may have dimples with different depths and/or different diameters. In an embodiment, the dimples may have at least three different diameters. In an embodiment, at least about 70% of the dimples may have a diameter of about 0.11 inches or greater. In an embodiment, the dimples may have at least three different depths. In an embodiment, 70% or more of the dimples may have a depth greater than 0.004 inches. In an embodiment, dimples may cover more than 80% of a golf ball's outer surface. In an embodiment, the total number of dimples is between about 300 and about 430, or between 300 and 420. In an embodiment, the total chordal dimple volume is between 370 and 385.

The half-shells themselves may be formed in a variety of manners, including but not limited to an injection molding process with a cold runner system; an injection molding process with a hot runner system; a reaction injection molding process; a gas-assisted injection molding process; a co-injection molding process; an insert-injection molding process; a casting process; a compression molding process; a vacuum forming process; a transfer molding process, or some combination of two or more of these.

Alternatively, the half-shells may be formed by a vacuum forming process ora transfer molding process with a thermoplastic sheet. The thermoplastic sheet may have a thickness in a range from 0.01 to 0.1 inches, preferably 0.015 to 0.09 inches, more preferably 0.02 to 0.08 inches.

FIG. 1 shows a top view of an array 100 of halves of a layer to be formed by ultrasonic welding in accordance with an embodiment. A layer 110 may be an intermediate layer or a cover layer. In an embodiment, 110 may be the outermost layer of a cover which has other material disposed within it. Extensions 120 result from forming a plurality of layer halves 100 in a mold, as will be known to ordinarily skilled artisans. The number of layer halves made at a time can vary in different embodiments.

FIG. 2A illustrates a side view opposed layer halves 210, 220 with extensions 215, surrounding a center 230 which may be constituted by a core. The opposed layer halves may constitute a core layer, an intermediate layer, or a cover layer. The center 230 may include not only a core, but a core layer, one or more intermediate layers, and (in the case of a golf ball with multiple cover layers) a cover layer.

FIG. 2B shows a top view of a layer half 210 with extensions 215, and a center 230. The layer half 210 and center 230 may be as described in FIG. 2A. FIG. 2C shows a side view of an assembly 250 after layer halves 210, 220 and center 230 from FIG. 2A are brought together and assembled using ultrasonic welding. FIG. 2D shows a top view of an assembly 270 of a plurality of assemblies 250.

According to embodiments, layer thicknesses and diameters, hardnesses, coefficients of restitution, and materials may be selected in accordance with desired golf ball performance, as is the case with golf balls manufactured according to other methods. Some important differences are that golf balls made by ultrasonic welding as described herein have more consistent and uniform construction and enjoy more consistent performance.

Figure 3:
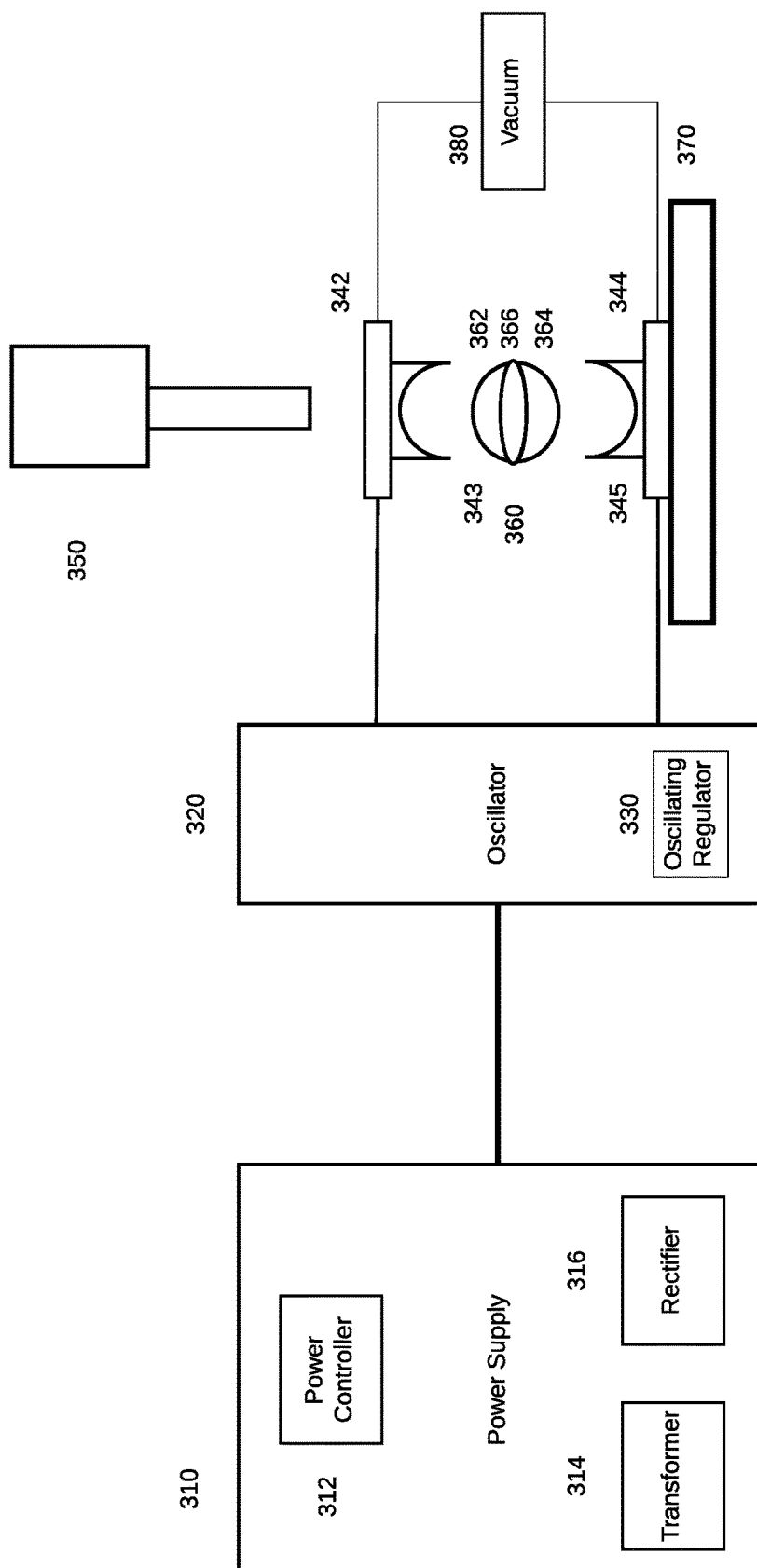
FIG. 3 shows exemplary apparatus for golf ball manufacture according to embodiments.

FIG. 3 is a high level diagram of an apparatus 300 for performing ultrasonic welding of golf ball components according to an embodiment. In FIG. 3, a power supply 310 includes a power controller 312, a high voltage transformer 314, and a rectifier 316. In an embodiment, power supply 310 receives 380V from a source. Different voltages also are possible. In an embodiment, power supply 310 may receive a voltage available at a common wall socket. In different parts of the world, that may be 100-120V, or 220-240V, for example. The voltage passes through power controller 312 to transformer 314, which boosts the voltage substantially, according to an embodiment. Transformer 314 may boost the voltage either more substantially or less substantially than this, depending on the embodiment. Rectifier 316 converts voltage from transformer 314 to DC voltage.

DC voltage output from power supply 310 passes to oscillator 320, which in an embodiment includes oscillating regulator 330, to produce the high-frequency energy necessary to effect ultrasonic welding. In operation, when upper and lower mold plates 342, 344 are forced together by operation of pressurized cylinder/piston 350, upper and lower half-shells 362, 364 come together by virtue of upper mold plate 342 being forced against lower mold plate 344, where lower mold plate 344 is positioned on flat surface 370 (sometimes referred to as an anvil). In an embodiment, outputs of oscillator 320 pass to upper and lower mold plates 342, 344 to impart high-frequency energy to the upper and lower half-shells 362, 364 so that the half-shells are welded together ultrasonically. Ultrasonic welding occurs around circumference 366, to form a resulting shell 360. In an embodiment, only one of the upper and lower mold plates 342, 344 receives an output from oscillator 320, so that only one of the half-shells receives the high-frequency energy to effect the ultrasonic welding.

Upper and lower mold plates 342, 344 have respective half-shell cavities 343, 345 which accommodate upper and lower half-shells 362, 364. There may be multiple ones of such cavities in each of the upper and lower mold plates, so that more than one ultrasonic welding process at a time may be carried out. In an embodiment, as many as 20 such cavities may be provided in each of the upper and lower mold plates.

To facilitate removing any trapped air between the inserted core or mantle and the half shells being fused together, one or more through holes (in an embodiment, as many as three) may be provided in each half shell cavity. A vacuum, through vacuum pump 380, provides vacuum through the through holes to remove any trapped air between the inserted core or mantle and the half shells during ultrasonic welding process. For ease of description, a welding operation for a single pair of half-shells is shown and described herein. For multiple half-shells, such as shown in FIG. 1 and FIG. 2D, upper and lower cavities for all of the half-shells may be part of a larger assembly for which a single pressurized cylinder or piston, or multiple pressurized cylinders or pistons, force the upper cavities against the lower cavities, with the lower cavities placed on a larger flat surface or anvil.

Figure 4B:
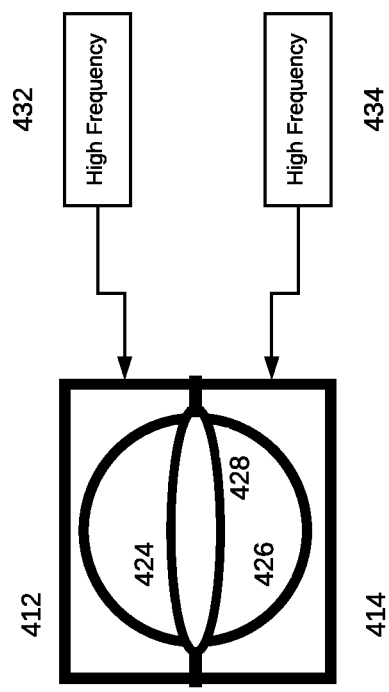
FIGS. 4A and 4B show additional detail to highlight manufacture of a golf ball, or portions thereof, according to embodiments.
Figure 4A:
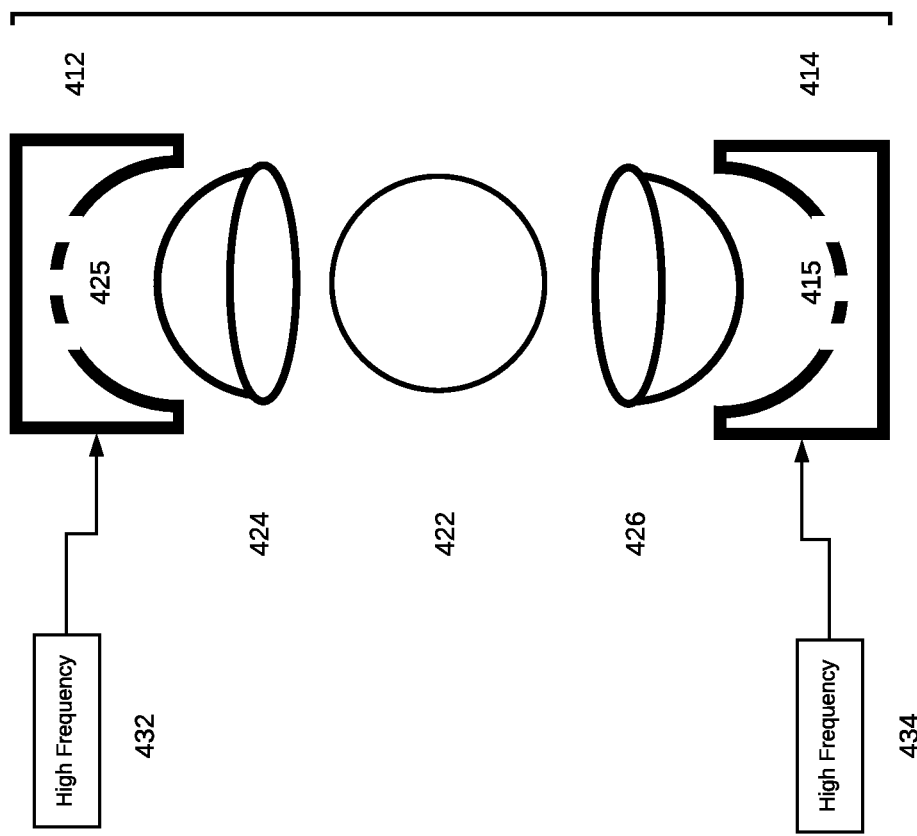

Looking in more detail at the upper/lower cavity configuration in FIG. 3, with reference to another example of ultrasonic welding in the context of golf ball construction, FIG. 4A shows upper mold plate 412 and lower mold plate 414, with a core or mantle 422 positioned therebetween, and with upper and lower half-shells 424, 426 above and below core/mantle 422. When upper and lower mold plates 412, 414 are forced together as shown in FIG. 4B, using a cylinder or piston such as that shown in FIG. 3, high frequency sources 432, 434, connected respectively to upper mold plate 412 and lower mold plate 414, impart high frequency energy to upper and lower half-shells 424, 426 so as to weld them together ultrasonically around core/mantle 422. The weld is provided around circumference 428. As noted above with respect to FIG. 3, in an embodiment, only one of the upper and lower mold plates 412, 414 receives an output from the oscillator, so that only one of the half-shells receives the vibrations to effect the ultrasonic welding.

FIG. 4A also shows through holes 415 in lower mold 414, and through holes 425 in upper mold 424, through which a vacuum may be applied via vacuum pump 380 in FIG. 3.

In an embodiment, the upper and lower mold plates in FIG. 3, and the upper and lower mold plates in FIGS. 4A and 4B, are electrically insulated from each other.

While numerous embodiments in accordance with different aspects of the invention have been described in detail, various modifications within the scope and spirit of the invention will be apparent to ordinarily skilled artisans. In particular, certain methods are disclosed, as well as individual steps for performing those methods. It should be understood that the invention is not limited to any particular disclosed sequence of method steps. Consequently, the invention is to be construed as limited only by the scope of the following claims.

What is claimed is:

1. A method of producing a golf ball, the method comprising:
   a. positioning a core between two half shells;
   b. positioning the two half shells with the core between a first half shell cavity on a first mold plate and a second half shell cavity on a second mold plate;
   c. closing the first and second mold plates, so as to make contact between the two half shells along a circumference of each;
   d. applying ultrasonic energy to at least one of the first and second mold plates to weld the two half shells along their respective circumferences to form an intermediate layer, a mantle comprising the core and the intermediate layer;
   e. positioning the mantle between an additional two half shells;
   f. positioning the additional two half shells with the mantle between a further first half shell cavity on an additional first mold plate and a further second half shell cavity on an additional second mold plate;
   g. closing the further first and second additional mold plates, so as to make contact between the additional two half shells along a circumference of each; and
   h. applying ultrasonic energy to at least one of the first and second additional mold plates to weld the additional two half shells along the their respective circumferences to form the golf ball with the mantle and an outermost layer.

2. A method as claimed in claim 1, wherein d. comprises applying ultrasonic energy to both of the first and second mold plates.

3. A method as claimed in claim 1, wherein h. comprises applying ultrasonic energy to both of the first and second additional mold plates.

4. A method as claimed in claim 1, further comprising preparing the two half shells with a thermoplastic sheet.

5. A method as claimed in claim 1, further comprising preparing the additional two half shells with a thermoplastic sheet.

6. A method as claimed in claim 1, wherein the outermost layer is a cover layer, the method further comprising forming a plurality of dimples on the cover layer by compression molding.

7. A method as claimed in claim 1, further comprising:
   i. positioning the golf ball with the mantle and the outermost layer between a further two half shells;
   j. positioning the further two half shells with the golf ball with the mantle and the outermost layer between a further first half shell cavity on a further first mold plate and a further second half shell cavity on a further second mold plate;
   k. closing the further first and second mold plates, so as to make contact between the further first half shell and the further second half shell along a circumference of each; and
   l. applying ultrasonic energy to at least one of the further first and second mold plates to weld the further two half shells along the their respective circumferences to form the golf ball with the core, two intermediate layers, and a cover layer.

8. A method as claimed in claim 7, further comprising preparing the further two half shells with a thermoplastic sheet.

9. A method as claimed in claim 7, further comprising forming a plurality of dimples on the cover layer by compression molding.

10. A method as claimed in claim 1, wherein the first mold plate contains at least two half shell cavities and the second mold plate contains at least two half shell cavities to form two golf balls, each with a mantle and an outermost layer.

11. A method as claimed in claim 1, wherein the first mold plate contains at least ten half shell cavities and the second mold plate contains at least ten half shell cavities to form ten golf balls, each with a mantle and an outermost layer.

12. A method as claimed in claim 1, wherein the first mold plate contains at least twenty half shell cavities and the second mold plate contains at least twenty half shell cavities to form twenty golf balls, each with a mantle and an outermost layer.

13. A method as claimed in claim 1, wherein each half-shell cavity contains at least one vacuum hole.

14. A method as claimed in claim 13, further comprising applying a vacuum applied through the vacuum hole in each respective half shell cavity during c., d., g., and h.

15. A method as claimed in claim 1, wherein each half-shell cavity contains at least three vacuum holes.

16. A method as claimed in claim 15, further comprising applying a vacuum applied through the vacuum hole in each respective half shell cavity during c., d., g., and h.

17. A method as claimed in claim 7, wherein each half-shell cavity contains at least one vacuum hole.

18. A method as claimed in claim 17, further comprising applying a vacuum applied through the vacuum hole in each respective half shell cavity during k. and l.

19. A method as claimed in claim 7, wherein each half-shell cavity contains at least three vacuum holes.

20. A method as claimed in claim 19, further comprising applying a vacuum applied through the vacuum hole in each respective half shell cavity during k. and l.

* * * * *